United States Patent
Goulahsen (10) Patent No.: US 9,831,979 B2
(45) Date of Patent: Nov. 28, 2017

(54) METHODS FOR TRANSMISSION AND RECEPTION OF A SERIAL SIGNAL AND CORRESPONDING DEVICES

(71) Applicant: STMICROELECTRONICS (GRENOBLE 2) SAS, Grenoble (FR)

(72) Inventor: Abdelaziz Goulahsen, Coublevie (FR)

(73) Assignee: STMICROELECTRONICS (GRENOBLE 2) SAS, Grenoble (FR)

(*) Notice: Subject to any disclaimer, the term of this patent is extended or adjusted under 35 U.S.C. 154(b) by 135 days.

(21) Appl. No.: 14/836,041

(22) Filed: Aug. 26, 2015

(65) Prior Publication Data
US 2016/0072610 A1    Mar. 10, 2016

(30) Foreign Application Priority Data
Sep. 9, 2014 (FR) .................................... 14 58427

(51) Int. Cl.
*H04K 1/00* (2006.01)
*G09C 1/00* (2006.01)
*H04L 9/06* (2006.01)

(52) U.S. Cl.
CPC ............... *H04K 1/00* (2013.01); *G09C 1/00* (2013.01); *H04L 9/0662* (2013.01)

(58) Field of Classification Search
None
See application file for complete search history.

(56) References Cited

U.S. PATENT DOCUMENTS 6,430,230 B1 * 8/2002 Cunningham ...... H04L 25/4908
                                                    375/292
6,747,580 B1 * 6/2004 Schmidt ................ H03M 5/145
                                                    341/106

(Continued)

FOREIGN PATENT DOCUMENTS

JP           2007-233993          9/2013

OTHER PUBLICATIONS

So et al, "Partnering for EMI Mitigation—A case study from the Lok Ma Chau Spur Line", no date provided, p. 1-7.*

(Continued)

*Primary Examiner* — Christopher Revak
(74) *Attorney, Agent, or Firm* — Slater Matsil, LLP (57) ABSTRACT

A device for transmitting a signal over a serial link includes a transmission processor to carry out, before transmission over the serial link, a scrambling process on successive initial packets of the signal to form a scrambled packet for each initial packet. The transmission processor includes an encoding circuit to carry out an encoding process on each initial packet to deliver an encoded packet. The encoding process includes, for each current initial packet starting from the second, encoding of the current initial packet with the preceding scrambled packet. Calculation circuitry determines, for each initial packet, a bit disparity of the encoded packet and determination of a cumulative bit disparity. Comparison circuitry carries out a comparison process involving the bit disparity of the encoded packet and the cumulative disparity, with the scrambled packet being the encoded packet or the inverted encoded packet, depending on the result of the comparison process.

42 Claims, 7 Drawing Sheets

(56) References Cited

U.S. PATENT DOCUMENTS

| | | | |
|---|---|---|---|
| 6,870,930 B1* | 3/2005 | Kim | G09G 5/006 |
| | | | 348/E7.056 |
| 7,082,199 B2* | 7/2006 | Onishi | H04L 9/0662 |
| | | | 380/268 |
| 7,187,307 B1* | 3/2007 | Schmidt | H04L 1/00 |
| | | | 341/50 |
| 7,292,161 B2* | 11/2007 | Widmer | H03M 7/04 |
| | | | 341/58 |
| 7,848,425 B2* | 12/2010 | Cho | H04N 19/597 |
| | | | 348/42 |
| 9,262,988 B2* | 2/2016 | Choi | G09G 5/006 |
| 2010/0202555 A1* | 8/2010 | Takahashi | H04L 25/4919 |
| | | | 375/292 |
| 2012/0163490 A1 | 6/2012 | Whitby-Strevens | |
| 2015/0171870 A1* | 6/2015 | Parker | H03K 19/17768 |
| | | | 380/44 |

OTHER PUBLICATIONS

Menezes et al. "Chapter 7 from the Handbook of Applied Cryptography" 1997; pp. 222-282; 1997, www.cacr.math.uwaterloo.ca/hac.
"Interlaken Protocol Definition: a Joint Specification of Cortina Systems and Cisco Systems" rev. 1.2; Oct. 7, 2008; pp. 52.

* cited by examiner

METHODS FOR TRANSMISSION AND RECEPTION OF A SERIAL SIGNAL AND CORRESPONDING DEVICES

FIELD OF THE INVENTION

Embodiments of the invention relate to the communication of information over a serial link, and more particularly, to scrambling of the signal before transmission, descrambling of the received signal and/or mitigation of electromagnetic interference (EMI).

BACKGROUND

Serial links, in particular but without limitation, may be links supporting numerous high-rate serial transmission standards in mobile terminals, such as cellular mobile telephones. Serial transmission standards include USB, PCIe, SATA and a point-to-point serial interface protocol, such as an MIPI low latency interface (MIPI LLI: Mobile Industry Processor Interface, Low Latency Interface).

One current approach used to carry out scrambling of a signal uses a pseudorandom number generator, for example, a linear feedback shift register (LFSR).

SUMMARY

According to one embodiment, it is proposed to avoid the use of a pseudorandom generator and to carry out the scrambling and descrambling of the signal by simplified logic.

Electromagnetic interference mitigation may be carried out on the signal, which is particularly straightforward to implement. The electromagnetic interference mitigation process may be carried out on its own or in combination with the scrambling and descrambling process.

One aspect provides a method for transmitting a signal over a serial link comprising, before transmission over the serial link, a scrambling process carried out on successive initial packets of the signal and forming a scrambled packet for each initial packet.

The initial packets may be packets taken from the signal without having undergone an electromagnetic interference mitigation process, or packets of the signal which have previously undergone an electromagnetic interference mitigation process. According to a general characteristic of this aspect, the scrambling process comprises, for each initial packet, an encoding process so as to obtain an encoded packet, with the encoding process comprising, for each current initial packet starting from the second, encoding of the current initial packet with the preceding scrambled packet. The method further includes a determination of a bit disparity of the encoded packet and a determination of a cumulative bit disparity, and a comparison process involving the bit disparity of the encoded packet and the cumulative disparity. The scrambled packet is the encoded packet or the inverted encoded packet, depending on the result of the comparison process.

Thus, according to this aspect, the use of a pseudorandom generator is avoided and is replaced with the data history. This results in a simplification of the processing logic and a reduction of the cumulative disparity.

It is to be recalled here that the bit disparity of a packet is, for example, the difference between the number of 1s and the number of 0s, although the difference between the number of 0s and the number of is could also be used. The cumulative disparity is the sum of the bit disparities associated with the current packet and with all the packets preceding this current packet.

According to one embodiment, the method also comprises formation of an indication of the result of the comparison, intended to be transmitted over the serial link. This indication indicates whether or not the encoded packet has been inverted. This indication is therefore generally over one bit.

Thus, the smaller the size of the packet, the lower the cumulative disparity, but the number of (1 bit) indications transmitted is high. The size of the packet therefore results from a compromise between the maximum allowable value of the cumulative disparity and the number of indication bits used.

In regards to the encoding of the first initial packet, this comprises encoding of the first initial packet with a scrambling key, for example, since there is no preceding scrambled packet. The scrambling key preferably has a bit disparity of zero (i.e., as many 0 bits as 1 bits) so as to allow a more rapid convergence.

According to one embodiment, the comparison process comprises a comparison between the absolute value of the difference between the cumulative disparity and the bit disparity of the encoded packet, with the absolute value of the sum of the cumulative disparity and the bit disparity of the encoded packet.

Thus, for example, the scrambled packet is the encoded packet if the absolute value of the difference between the cumulative disparity and the bit disparity of the encoded packet is greater than or equal to the absolute value of the sum of the cumulative disparity and the bit disparity of the encoded packet, and the inverse of the encoded packet if the absolute value of the difference between the cumulative disparity and the bit disparity of the encoded packet is less than the absolute value of the sum of the cumulative disparity and the bit disparity of the encoded packet.

The encoding of the current initial packet starting from the second advantageously comprises the application of an invertible logical operator, which is preferably symmetrical, to the current initial packet and to the preceding scrambled packet. Thus, such an operator makes it possible to do without a pseudorandom generator. Here, a symmetrical logical operator is a logical operator having an output probability equal or close to 0.5 (i.e., delivering at its output as many or almost as many 0s as 1s) irrespective of the input probability. An invertible logical operator is an operator having an inverse operator capable of carrying out the decoding of a packet encoded with the operator.

By way of example, an EXCLUSIVE OR function, which has a truth table having 50% is and 50% 0s and which is particularly simple to implement, may be used as a symmetrical and invertible logical operator. The complement of an EXCLUSIVE OR function could also be used, or alternatively, any set of logic gates emulating such logical operators. By analogy, the encoding of the first initial packet comprises the application of the invertible logical operator which is preferably symmetrical (for example, the EXCLUSIVE OR function) to the first initial packet and to the scrambling key.

According to one embodiment, the method may comprise, before transmission over the serial link and before or after the scrambling process, an electromagnetic interference mitigation process. More particularly, attenuation of the electromagnetic interference peaks in the signal may be carried out on successive primary packets of the signal, with the mitigation process delivering successive processed primary packets.

If the electromagnetic interference mitigation process is carried out before the scrambling process, the successive initial packets (on which the scrambling operation is carried out) are successive processed primary packets. Alternatively, the process may be carried out on at least packets derived from the successive processed primary packets, if for example, another process (for example filtering) is carried out between the electromagnetic interference mitigation process and the scrambling process.

If the electromagnetic interference mitigation process is carried out after the scrambling process, the successive primary packets are the successive scrambled packets. Alternatively, the process may be carried out on at least packets derived from the successive scrambled primary packets, if for example, another process (for example filtering) is carried out between the scrambling process and the electromagnetic interference mitigation process.

The mitigation process is particularly straightforward to carry out, and thus comprises, for example, for each primary packet, encoding of the primary packet with an invertible additional logical operator, which is preferably symmetrical, and an encoding key. The encoding key may be different from one primary packet to another. The encoding key preferably has a non-zero bit disparity and a constant bit disparity from one encoding key to another. Although encoding keys having a bit disparity of zero could be used, a non-zero bit disparity allows more rapid convergence.

The use of a symmetrical operator for the logical operator used in the scrambling process and for the additional logical operator used in the electromagnetic interference mitigation process is advantageous because such a symmetrical operator does not interfere, or substantially does not interfere, with the symmetrical or asymmetrical nature provided by the bit disparity of the scrambling key and of each encoding key. For example, the encoding of the primary packet with the encoding key may comprise the application of an additional EXCLUSIVE OR function to the primary packet and to the encoding key.

This electromagnetic interference mitigation process may also be carried out on its own, that is to say, without it being necessary to perform scrambling processes. Thus, another aspect provides a method for transmitting a signal over a serial link, comprising, before transmission over the serial link, an electromagnetic interference mitigation process carried out on successive primary packets of the signal and delivering successive processed primary packets. The mitigation process comprises, for each primary packet, encoding of the primary packet with an invertible logical operator, which is preferably symmetrical, and an encoding key. The encoding key is different from one primary packet to another. The encoding key has a preferably non-zero bit disparity which is constant from one encoding key to another.

According to one embodiment, the encoding of the primary packet with the encoding key comprises the application of an invertible additional logical operator to the primary packet and to the encoding key. Another aspect provides a method for receiving a signal sent over a serial link, comprising a descrambling process carried out on successive scrambled initial packets of the signal and forming a descrambled packet for each scrambled initial packet.

Here again, the scrambled initial packets may be packets which are taken from the received signal and have not previously undergone an electromagnetic interference mitigation process, or which have previously undergone an electromagnetic interference mitigation process.

According to a general characteristic of this other aspect the descrambling process comprises, for each scrambled initial packet, a decoding process so as to obtain a decoded packet. The decoding process comprises, for each current received scrambled initial packet starting from the second, decoding of the current scrambled initial packet with the preceding descrambled packet. The descrambled packet is the decoded packet or the inverted decoded packet, depending on an indication associated with the scrambled initial packet and contained in the received signal. It should be noted here that the characteristics of the scrambling and descrambling processes make it possible to avoid any synchronization between the signal transmission and reception parts.

According to one embodiment, the decoding of the current scrambled initial packet starting from the second comprises the application of a logical operator which is the inverse of that used to obtain the current scrambled initial packet (for example, an EXCLUSIVE OR function) to the current scrambled initial packet and to the preceding descrambled packet.

According to one embodiment, the process of decoding the first scrambled initial packet comprises decoding of the first scrambled initial packet with a descrambling key identical to a scrambling key used to obtain the first scrambled initial packet. More precisely, the decoding of the first scrambled initial packet comprises the application of the inverse logical operator (for example, an EXCLUSIVE OR function) to the first scrambled initial packet and to the descrambling key.

Here again, it is advantageous to combine the descrambling process with an electromagnetic interference mitigation process. More precisely, according to one embodiment, the method furthermore comprises, before or after the descrambling process, an electromagnetic interference mitigation process carried out on successive encoded secondary packets of the received signal and delivering successive processed secondary packets.

If the electromagnetic interference mitigation process is carried out before the scrambling process, the successive encoded secondary packets are successive scrambled packets of the received signal, and the scrambled initial packets (on which the descrambling process is carried out) are the successive processed secondary packets (or at least packets derived from the successive processed secondary packets, if for example, another process (for example, filtering) is carried out between the electromagnetic interference mitigation process and the descrambling process).

If the electromagnetic interference mitigation process is carried out after the scrambling process, the successive encoded secondary packets are the successive descrambled packets (or at least packets derived from the successive descrambled packets, if for example, another process (for example, filtering) is carried out between the descrambling process and the electromagnetic interference mitigation process).

According to one embodiment, the mitigation process comprises, for each encoded secondary packet, decoding of the encoded secondary packet with an additional logical operator which is the inverse of that used to obtain the encoded secondary packet (for example, an EXCLUSIVE OR function) and a decoding key identical to an encoding key used to obtain the encoded secondary packet. The decoding key may be different from one encoded secondary packet to another, and the decoding key may have a preferably non-zero bit disparity which is constant from one decoding key to another.

At the signal reception level, it is possible to carry out the electromagnetic interference mitigation process on its own. This is done without necessarily carrying out the descrambling process afterwards.

Thus, another aspect provides a method for receiving a signal sent over a serial link, comprising an electromagnetic interference mitigation process carried out on successive encoded secondary packets of the received signal and delivering successive processed secondary packets. The mitigation process comprises, for each encoded secondary packet, decoding of the encoded secondary packet with an additional logical operator which is the inverse of that used to obtain the encoded secondary packet (for example, an EXCLUSIVE OR function) and a decoding key identical to an encoding key used to obtain the encoded secondary packet. The decoding key may be different from one encoded secondary packet to another, and the decoding key has a preferably non-zero bit disparity which is constant from one decoding key to another.

Another aspect provides a device for transmitting a signal over a serial link, comprising transmission processing means or a transmission processor configured to carry out, before transmission over the serial link, a scrambling process on successive initial packets of the signal so as to form a scrambled packet for each initial packet.

According to a general characteristic of this other aspect, the transmission processing means comprise an encoding circuit configured to carry out an encoding process on each initial packet so as to deliver an encoded packet. The encoding process comprises, for each current initial packet starting from the second, encoding of the current initial packet with the preceding scrambled packet. Calculation means or calculation circuitry is configured to determine, for each initial packet, a bit disparity of the encoded packet and determination of a cumulative bit disparity. Comparison means or comparison circuitry is configured to carry out a comparison process involving the bit disparity of the encoded packet and the cumulative disparity. The scrambled packet is the encoded packet or the inverted encoded packet, depending on the result of the comparison process.

According to one embodiment, the transmission processing means or a transmission processor is configured to form, with the scrambled packet, an indication of the result of the comparison process, intended to be transmitted over the serial link.

According to one embodiment, the comparison means is configured to carry out a comparison between, on the one hand, the absolute value of the difference between the cumulative disparity and the bit disparity of the encoded packet and, on the other hand, the absolute value of the sum of the cumulative disparity and the bit disparity of the encoded packet.

According to one embodiment, the transmission processing means is configured to deliver, as the scrambled packet, the encoded packet if the absolute value of the difference between the cumulative disparity and the bit disparity of the encoded packet is greater than or equal to the absolute value of the sum of the cumulative disparity and the bit disparity of the encoded packet, and the inverse of the encoded packet if the absolute value of the difference between the cumulative disparity and the bit disparity of the encoded packet is less than the absolute value of the sum of the cumulative disparity and the bit disparity of the encoded packet.

According to one embodiment, the transmission processing means comprise a multiplexer having a first input connected to the output of the encoding circuit, a second input connected to the output of the encoding circuit via an inverter, a control input configured to receive the result indication of the comparison process, and an output delivering each scrambled packet.

According to one embodiment, the encoding circuit comprises an invertible logical operator, which is preferably symmetrical, for example, an EXCLUSIVE OR logic gate, having a first input intended to receive the initial packet, a second input intended to receive, for each current initial packet starting from the second, the preceding scrambled packet, and for the first initial packet a scrambling key, and an output intended to deliver the encoded packet.

According to one embodiment, the device furthermore comprises, upstream or downstream of the transmission processing means, transmission preprocessing means or transmission pre-processor is configured to carry out an electromagnetic interference mitigation process on successive primary packets of the signal so as to deliver successive processed primary packets.

According to one embodiment, the transmission preprocessing means comprise a basic encoding circuit configured to encode each primary packet with an invertible additional logical operator, which is preferably symmetrical, and an encoding key. The encoding key is different from one primary packet to another. The encoding key has a preferably non-zero bit disparity which is constant from one encoding key to another.

According to one embodiment, the basic encoding circuit comprises an additional EXCLUSIVE OR logic gate having a first input intended to receive the primary packet, a second input intended to receive the corresponding encoding key, and an output intended to deliver the processed primary packet.

Another aspect provides a device for transmitting a signal over a serial link, comprising transmission preprocessing means configured to carry out, before transmission over the serial link, an electromagnetic interference mitigation process on successive primary packets of the signal so as to form successive processed primary packets. The transmission preprocessing means comprises a basic encoding circuit configured to encode each primary packet with an invertible additional logical operator, which is preferably symmetrical, and an encoding key. The encoding key is different from one primary packet to another. The encoding key has a preferably non-zero bit disparity which is constant from one encoding key to another.

According to one embodiment, the basic encoding circuit comprises an EXCLUSIVE OR logic gate having a first input intended to receive the primary packet, a second input intended to receive the corresponding encoding key, and an output intended to deliver the processed primary packet.

The transmission device as defined above may advantageously be produced in an integrated form.

Another aspect provides a device for receiving a serial signal sent over a serial link, comprising reception processing means or a reception processor configured to carry out a descrambling process on successive scrambled initial packets of the signal so as to form a descrambled packet for each scrambled initial packet.

According to a general characteristic of this other aspect, the reception processing means comprise a decoding circuit configured to carry out a decoding process on each scrambled initial packet so as to deliver a current decoded packet. The decoding process comprises, for each current scrambled initial packet starting from the second, decoding of the current scrambled initial packet with the preceding descrambled packet. The descrambled packet is the decoded packet or the inverted decoded packet, depending on an indication associated with the scrambled initial packet and contained in the received signal.

According to one embodiment, the decoding circuit is furthermore configured to decode the first scrambled initial packet with a descrambling key identical to a scrambling key used to obtain the first scrambled initial packet.

According to one embodiment, the decoding circuit comprises a logical operator which is the inverse of that used to obtain the scrambled initial packets, for example, an EXCLUSIVE OR logic gate. The logic gate has a first input intended to receive the scrambled initial packet, a second input intended to receive, for each current scrambled initial packet starting from the second, the preceding descrambled packet, and for the first scrambled packet the descrambling key.

According to one embodiment, the reception processing means comprise a multiplexer having a first input connected to the output of the decoding circuit, a second input connected to the output of the decoding circuit via an inverter, a control input configured to receive the indication, and an output delivering the descrambled packet.

According to one embodiment, the device may furthermore comprise, upstream or downstream of the reception processing means, reception preprocessing means or a reception preprocessor configured to carry out an electromagnetic interference mitigation process on successive encoded secondary packets of the received signal so as to deliver successive processed secondary packets.

According to one embodiment, the reception preprocessing means comprise an additional decoding circuit configured to decode each encoded secondary packet with a decoding key identical to an encoding key used to obtain the encoded secondary packet. The decoding key is different from one encoded secondary packet to another and the decoding key has a preferably non-zero bit disparity which is constant from one decoding key to another.

According to one embodiment, the additional decoding circuit comprises an additional logical operator which is the inverse of that used to obtain the encoded secondary packets, for example, an additional EXCLUSIVE OR logic gate. The logic gate has a first input for receiving the encoded secondary packet, a second input for receiving the corresponding decoding key, and an output for delivering the corresponding processed secondary packet.

Another aspect provides a device for receiving a serial signal sent over a serial link, comprising reception preprocessing means configured to carry out an electromagnetic interference mitigation process on successive encoded secondary packets of the received signal and delivering successive processed secondary packets. The reception preprocessing means comprises a decoding circuit configured to decode each encoded secondary packet with an additional logical operator, which is the inverse of that used to obtain the encoded secondary packets, and a decoding key identical to an encoding key used to obtain the encoded secondary packet. The decoding key is different from one encoded secondary packet to another and the decoding key has a preferably non-zero bit disparity which is constant from one decoding key to another.

According to one embodiment, the decoding circuit comprises an EXCLUSIVE OR logic gate having a first input for receiving the encoded secondary packet, a second input for receiving the corresponding decoding key, and an output for delivering the corresponding processed secondary packet.

The reception device defined above may advantageously be produced in an integrated form.

Another aspect provides a communication apparatus, for example, a cellular mobile telephone, comprising at least one communication interface incorporating a transmission device as defined above and a reception device as also defined above.

BRIEF DESCRIPTION OF THE DRAWINGS

Other advantages and characteristics of the invention will become apparent on studying the detailed description of entirely nonlimiting embodiments and the appended drawings, in which.

DETAILED DESCRIPTION

Figure 1:
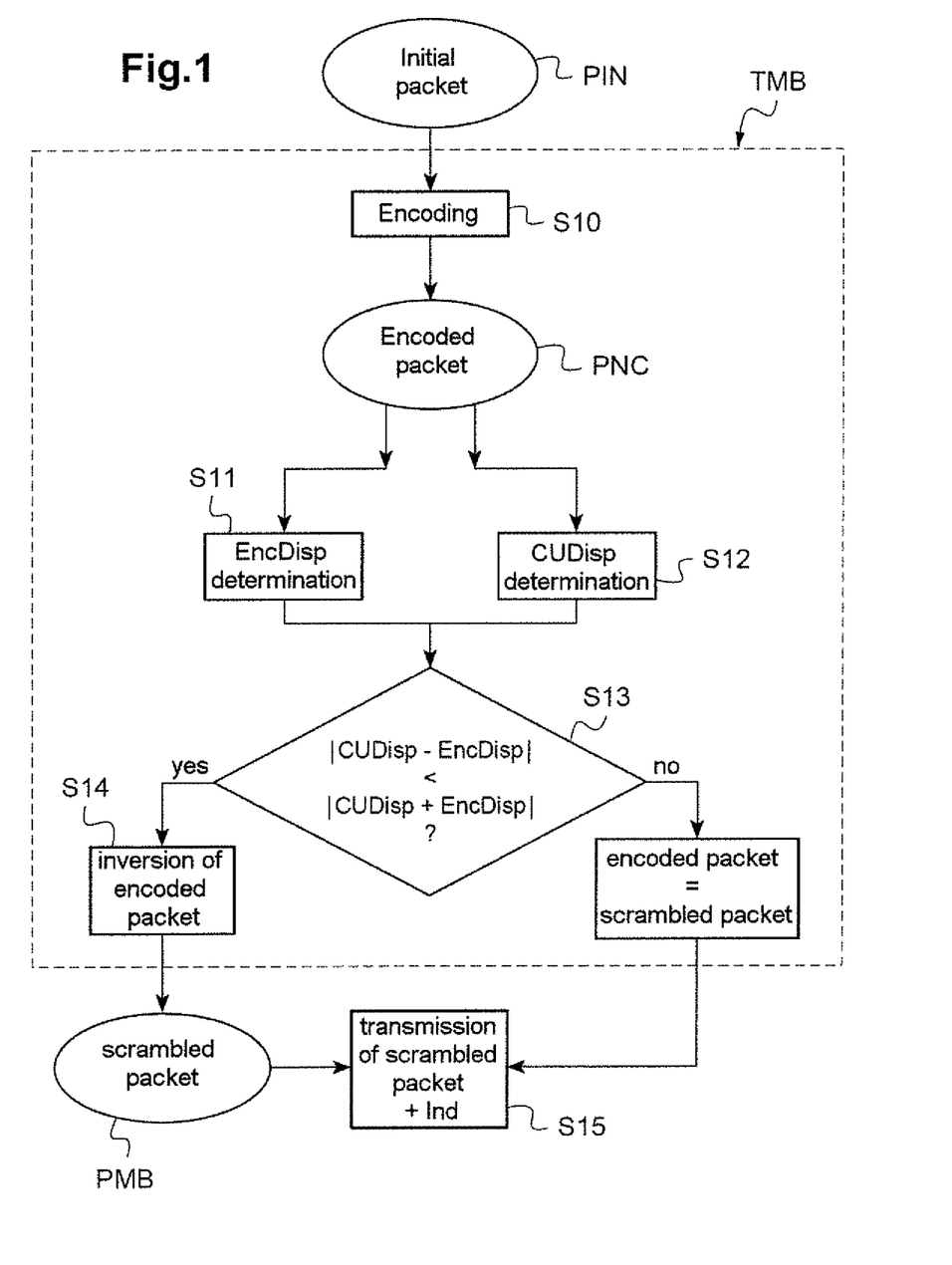
FIGS. 1 to 14 schematically illustrate various embodiments of the invention.

FIG. 1 illustrates a flow chart of an embodiment of a method for transmitting a signal over a serial link comprising a scrambling process TMB. The scrambling process is carried out on successive initial packets PIN of the signal and, for each initial packet PIN, the scrambling process forms a scrambled packet PMB associated with an indication Ind. The meaning of Ind will be returned to in more detail below.

As indicated above, the size of the packets results from a compromise between the number of indication bits transmitted over the serial link and the maximum allowable value of a cumulative bit disparity CUDisp. In general, the size of the initial packets may be equal to 8, 16, 32 or 64 bits.

Throughout what follows, by way of a nonlimiting example, it will be assumed that the size of the packets PIN is 8 bits. The scrambling process TMB comprises an encoding process S10 so as to obtain an encoded packet PNC. The scrambling process TMB also comprises determination S11 of a bit disparity EncDisp of the encoded packet and determination S12 of the cumulative bit disparity CUDisp.

The bit disparity EncDisp of the encoded packet is the difference between the number of 1s and the number of 0s of the encoded packet (although the difference between the number of 0s and the number of 1s could also be used). The cumulative bit disparity is the sum of the bit disparities of the encoded packet and of all the preceding packets. The disparities EncDisp and CUDisp may be negative or positive.

The scrambling process TMB next comprises a comparison process S13 involving the bit disparity EncDisp of the encoded packet and the cumulative disparity CUDisp.

More precisely, the comparison process comprises a comparison between, on the one hand, the absolute value of the difference between the cumulative disparity CUDisp and the bit disparity EncDisp of the encoded packet and, on the other hand, the absolute value of the sum of this cumulative disparity and the bit disparity of the encoded packet.

Thus, as illustrated in FIG. 1, if the absolute value of the difference between the cumulative disparity CUDisp and the bit disparity EncDisp of the encoded packet is greater than or equal to the absolute value of the sum of these two disparities, then the scrambled packet PMB is the encoded packet PNC.

Conversely, if the absolute value of the difference between the cumulative disparity and the bit disparity of the encoded packet is less than the absolute value of the sum of these two disparities, inversion S14 of the packet to be encoded is carried out. The scrambled packet PMB then is the inverted encoded packet.

The scrambled packet is then transmitted (step S15) over the serial link, accompanied by the indication Ind, generally over one bit, indicating whether or not there has been an inversion of the encoded packet, after a parallel/serial conversion and an optional subsequent post processing (filtering, etc.).

Figure 2:
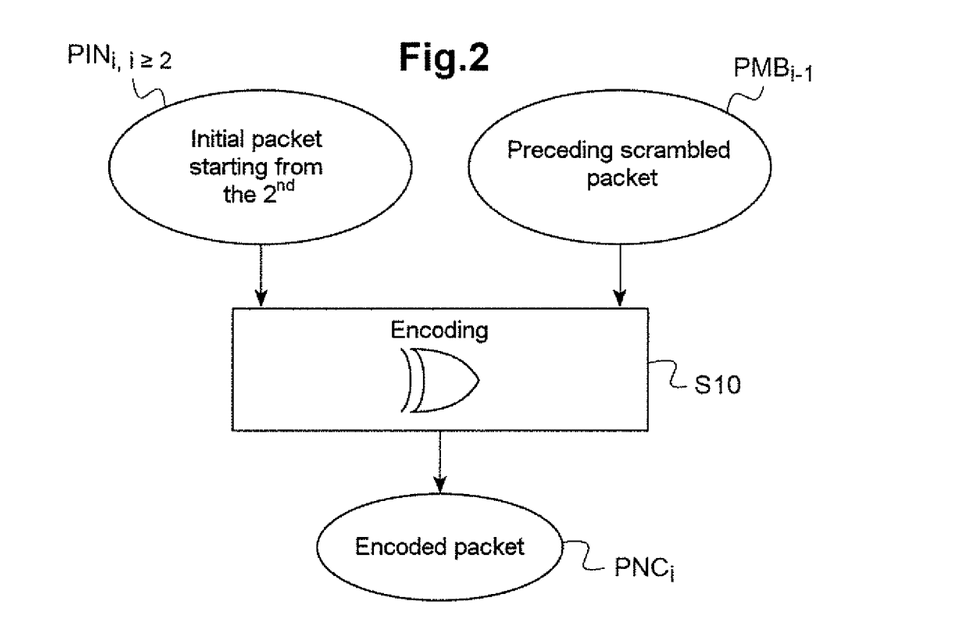

As illustrated in FIG. 2, the encoding S10 of the initial packet $PIN_i$ starting from the second (i≥2) is carried out with the preceding scrambled packet $PMB_{i-1}$ as the key, and more particularly by applying an EXCLUSIVE OR logical function to these two packets PINi and $PMBi_{-1}$. The output of the EXCLUSIVE OR logical function provides the packet to be encoded $PNC_i$.

Figure 3:
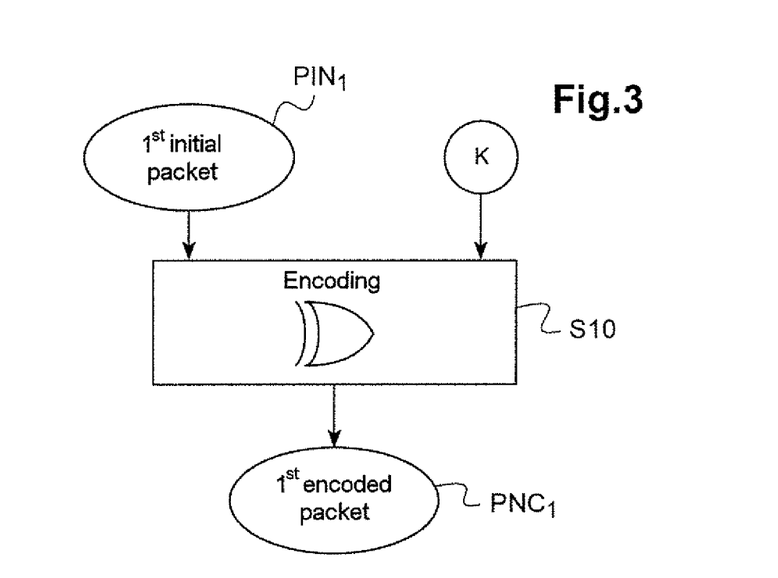

In regards to the first initial packet $PIN_1$, as illustrated in FIG. 3, its encoding S10 is carried out with the aid of a scrambling key K. The scrambling key K has a bit disparity of zero since there is no preceding scrambled packet for the first initial packet.

The key, also over 8 bits, as well as the first initial packet $PIN_1$, are applied to the two inputs of the EXCLUSIVE OR logic gate to provide the first encoded packet $PNC_1$.

Figure 4:
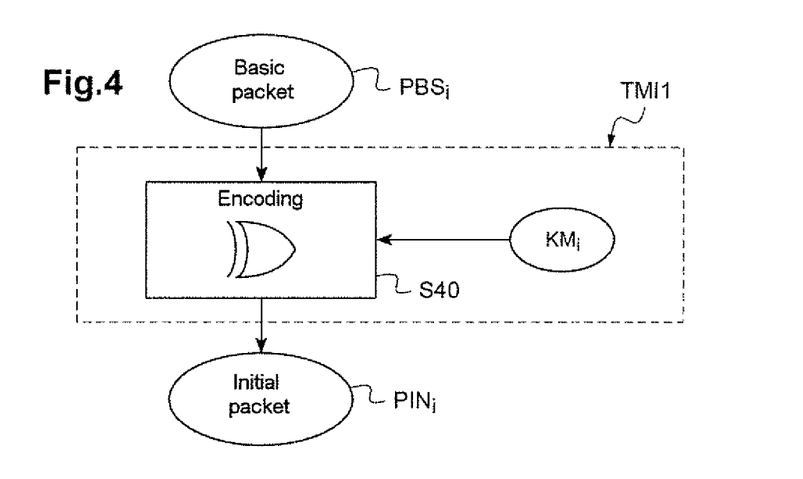

It may be advantageous, as illustrated in FIG. 4, before the scrambling process, to carry out a process TMI1 of attenuating the electromagnetic interference peaks present in the signal. This process TMI1 is carried out on successive primary packets $PBS_i$ of the signal, and delivers successive processed primary packets, which in this case are the successive initial packets $PIN_i$.

The mitigation process is carried out, for each primary packet $PBS_i$, by encoding the primary packet with an encoding key $KM_i$. The encoding key is different from one primary packet to another. In this example, the encoding key has a non-zero bit disparity which is constant from one encoding key to another. Here again, to simplify the logic, the encoding S40 of the primary packet with the encoding key $KM_i$ may be carried out by applying an additional EXCLUSIVE OR function to the primary packet and to the encoding key.

As a variation, it would be possible to carry out the mitigation process after the scrambling process.

This being the case, it is also possible to carry out only this electromagnetic interference mitigation process without previously or subsequently carrying out the scrambling process TMB. In this case, the processed primary packets $PIN_i$ delivered by the mitigation process TMI1 will be the packets transmitted over the serial link, after parallel/serial conversion and optional subsequent post processing (filtering, etc.).

Figure 5:
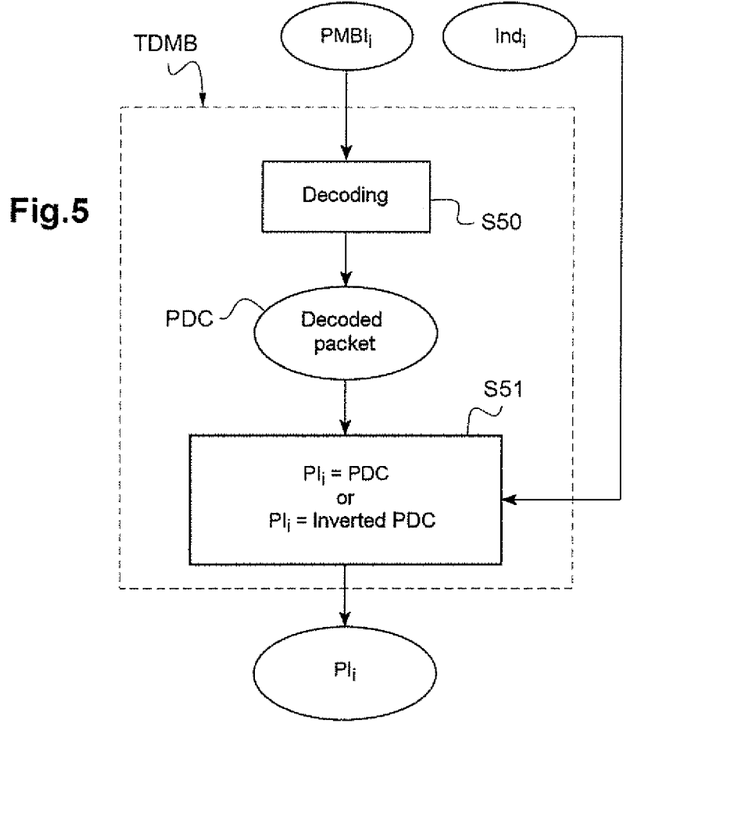

On the reception side, as illustrated in FIG. 5, one embodiment of the method for receiving the signal sent over the serial link comprises a descrambling process TDMB carried out on the successive scrambled initial packets $PMBI_i$ of the signal. This descrambling process forms a descrambled packet $PI_i$ for each scrambled initial packet $PMBI_i$.

Here again, if no electromagnetic interference mitigation process has been carried out on the transmission side, the successive scrambled initial packets are, for example, derived directly from the received signal. Conversely, as will be seen in more detail below, if an electromagnetic interference mitigation process has been carried out on the transmission side, the successive scrambled initial packets $PMBI_i$ may be taken from encoded secondary packets of the received signal after the latter have also undergone an electromagnetic interference mitigation process.

For each scrambled initial packet $PMBI_i$, the descrambling process TDMB comprises a decoding process S50 so as to obtain a decoded packet PDC. The descrambled packet $PI_i$ is then the decoded packet PDC or the inverted decoded packet, depending on the indication $Ind_i$ associated with the scrambled initial packet $PMBI_i$ and contained in the received signal (step S51).

Figure 6:
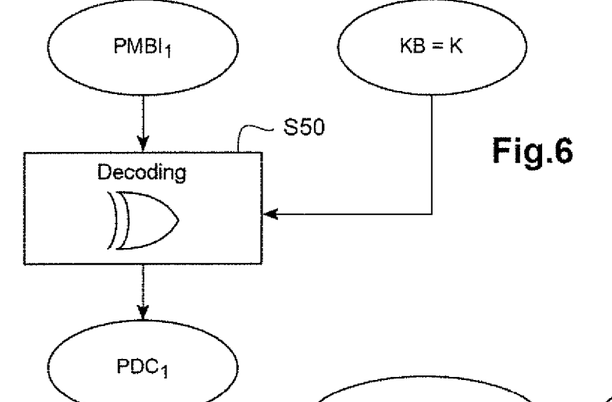

As illustrated in FIG. 6, and by analogy with what has been done on the transmission side, the decoding S50 of the first scrambled initial packet comprises decoding of the first scrambled initial packet $PMBI_1$ with a descrambling key KB which is identical to the scrambling key K used to obtain the first scrambled initial packet $PMB_1$.

Here again, to simplify the logic, this encoding comprises the application of an EXCLUSIVE OR function to the first scrambled initial packet $PMBI_1$ and to the descrambling key KB so as to obtain the first decoded packet $PDC_1$.

Figure 7:
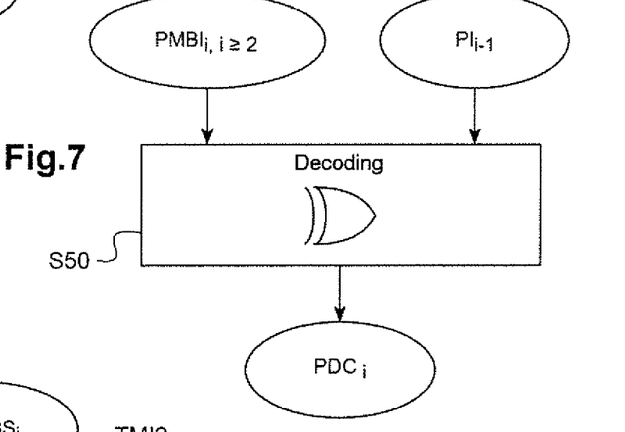

In regards to the current scrambled initial packet $PMBI_i$, starting from the second (i≥2), its decoding comprises (FIG. 7) application of the EXCLUSIVE OR function to this current scrambled initial packet and to the preceding descrambled packet $PI_{i-1}$, so as to obtain the decoded packet $PDC_i$.

Figure 8:
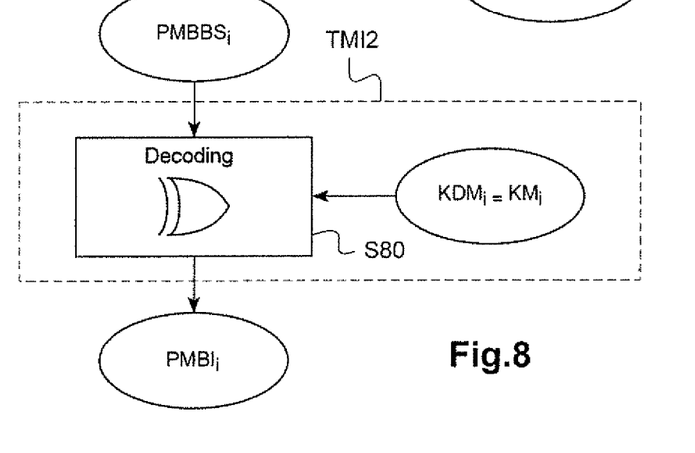

If an electromagnetic interference mitigation process has been carried out on the transmission side, a similar process TMI2 is carried out on successive encoded secondary packets $PMBBS_i$ (which in this case are scrambled packets), so as to deliver processed secondary packets which here form the successive scrambled initial packets $PMBI_i$, as schematically illustrated in FIG. 8.

For each encoded secondary packet $PMBBS_i$, this electromagnetic interference mitigation process TMI2 comprises decoding S80 of this encoded secondary packet with a decoding key $KDM_i$ identical to the encoding key $KM_i$ used to obtain the encoded secondary packet. This decoding key here again is different from one encoded secondary packet to another, and has a non-zero bit disparity which is constant from one decoding key to another.

In that which has just been described, and in that which will be described below, when the electromagnetic interference mitigation process TMI2 is carried out in combination with the descrambling process TDMB, the process TMI2 is carried out before the process TDMB.

This process TMI2 could, however, be carried out after the process TDMB even if the corresponding electromagnetic interference mitigation process TMI1 was carried out before the scrambling process TMB on the transmission side.

This is because, in general, the order in which the processes TMI1 and TMB are carried out on the transmission side is not important, and the order in which the processes TMI2 and TDMB are carried out on the reception side is also not important and independent of the order in which the processes TMI1 and TMB are carried out on the transmission side.

Of course, if only the electromagnetic interference mitigation process has been carried out on the transmission side, only the interference mitigation process will be carried out on the reception side.

Figure 9:
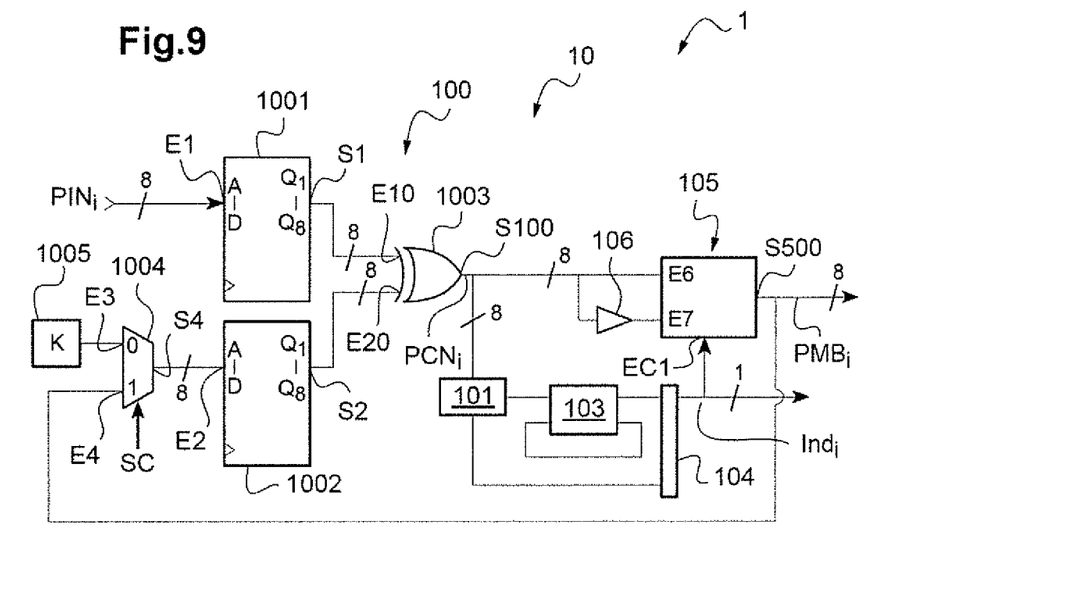
Figure 10:
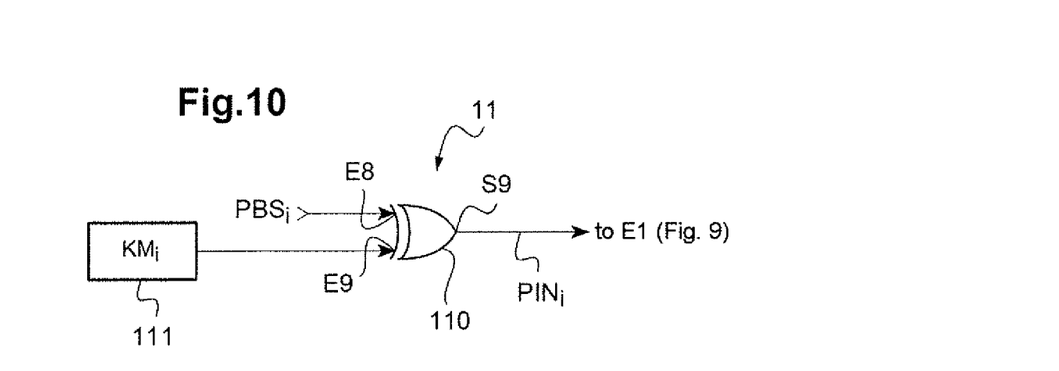

Reference will now be made more particularly to FIGS. 9 and 10 to describe two embodiments of a device for transmitting a signal over a serial link, capable of carrying out the transmission methods which have just been described.

In FIG. 9, reference 1 denotes a device for transmitting a signal over a serial link, comprising transmission processing means or a transmission processor 10 configured to carry out, before transmission over the serial link, the scrambling process on the successive initial packets $PIN_i$ so as to obtain the scrambled packets $PMB_i$.

In this regard, the transmission processing means 10 comprise an encoding circuit 100 comprising, in this embodiment, a first register 1001 having an input E1 for receiving the successive initial packets $PIN_i$. In this example, the eight bits of each packet are processed in parallel.

The encoding circuit also comprises a second register 1002 capable of storing a key for the encoding of the packet $PIN_i$. The registers 1001 and 1002 are used to regulate the timing of the processing, but are not in any way indispensable.

More precisely, as indicated above, the key may be a scrambling key K stored in a register 1005, if the initial packet is the first, or the preceding scrambled packet for any current initial packet starting from the second. In this regard, a multiplexer 1004 comprises an input E3 connected to the register 1005 and an input E4 connected to the output S500 of a multiplexer 105 delivering the successive scrambled packets $PMB_i$. The multiplexer 1004 is controlled by a control signal SC, which takes, for example, a value 0 for the first initial packet and the value 1 for the other initial packets.

The output S4 of the multiplexer 1004 is connected to the input E2 of the register 1002. The outputs S1 and S2 of the registers 1001 and 1002 are respectively connected to the inputs E10 and E20 of an EXCLUSIVE OR logic gate 1003 forming part of the encoding circuit 100. The output S100 of this EXCLUSIVE OR logic gate therefore delivers the successive encoded packets $PNC_i$.

The transmission processing means 10 also comprise a calculation unit 101 configured to determine, for each initial packet, the bit disparity EncDisp of the encoded packet PNC and a calculation unit 103 configured to determine the cumulative bit disparity CUDisp. These calculation units may be produced in a conventional way in the form of logic circuits.

The processing means also comprise comparison means or comparison circuitry 104 configured to carry out the comparison process involving the bit disparity of the encoded packet and the cumulative disparity, so as to deliver the indication $Ind_i$.

The transmission processing means also comprise the multiplexer 105 having a first input E6 connected to the output of the encoding circuit 1003, a second input E7 connected to the output of the encoding circuit 1003 via an inverter 106, a control input EC1 for receiving the indication $Ind_i$ of the result of the comparison process, and the output S500 delivering the successive scrambled packets $PMB_i$.

The packets $PMB_i$ as well as the associated indications $Ind_i$ are delivered over the serial link. In this regard, a parallel/serial conversion unit is provided to serialize the bits of the packets $PMB_i$ before transmission over the serial link. Furthermore, as indicated above, the bits of these packets may also be subjected to other post processing, such as filtering processes, before transmission over the serial link.

In the case in which electromagnetic interference processing is carried out prior to the scrambling process, as illustrated in FIG. 10, the device 1 furthermore comprises transmission preprocessing means or a transmission preprocessor 11, located upstream of the transmission processing means 10. The transmission preprocessing means 11 is configured to carry out an electromagnetic interference mitigation process on the successive primary packets $PBS_i$ so as to deliver the successive initial packets $PIN_i$.

In this regard, the transmission preprocessing means 11 comprise a basic encoding circuit, here comprising an additional EXCLUSIVE OR logic gate 110. This logic gate 110 comprises a first input E8 for receiving the successive primary packets $PBS_i$ and an input E9 for receiving an encoding key $KM_i$ stored in a register 111.

This encoding key is different for each packet $PBS_i$. It furthermore has a constant non-zero bit disparity. One particularly straightforward way of producing these various keys is to provide for the register 111 to be a circular shift register clocked at a frequency equal to the bit frequency divided by n, where n is the number of bits of each packet.

The output S9 of the logic gate 110 is connected either to the input E1 of the register 1001 of the transmission processing means 10 or directly to the parallel/serial conversion unit if no scrambling process is carried out.

Figure 11:
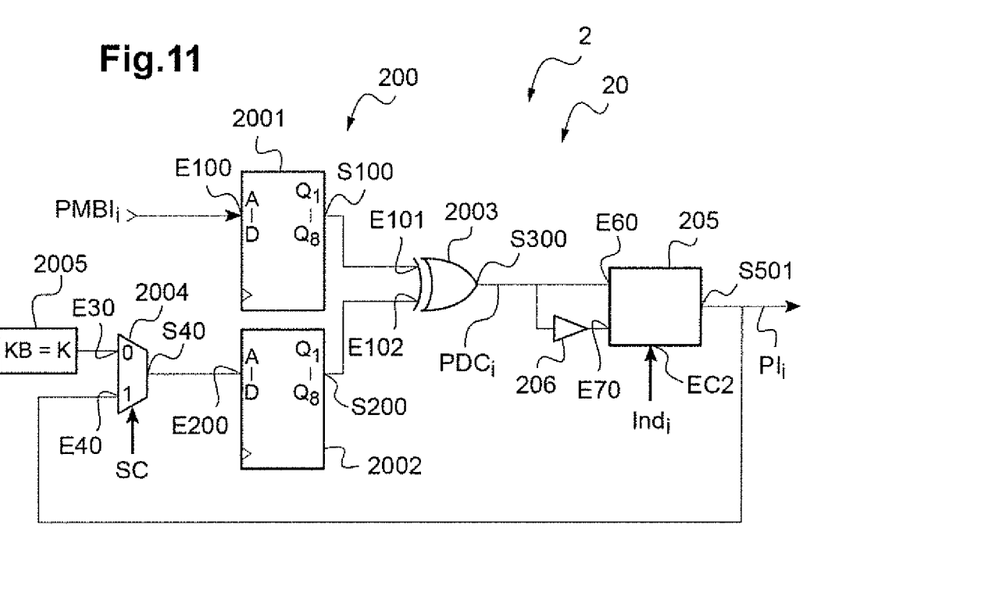
Figure 12:
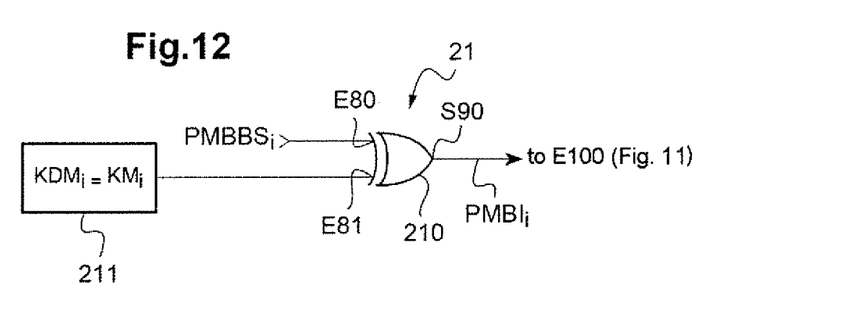

Reference will now be made more particularly to FIGS. 11 and 12, which schematically illustrate embodiments of a device for receiving a serial signal sent over a serial link.

In FIG. 11, reference 2 denotes such a reception device comprising reception processing means pr a reception processor 20 configured to carry out the descrambling process on the successive scrambled initial packets $PMBI_i$ so as to form the successive descrambled packets $PI_i$.

The reception processing means 20 comprise a decoding circuit 200 having a first register 2001 and a second register 2002, the two outputs S100 and S200 of which are respectively connected to the two inputs E101 and E102 of an EXCLUSIVE OR logic gate 2003, the output S300 of which delivers the successive decoded packets $PDC_i$.

The registers 2001 and 2002 are used to regulate the timing of the processing, but are not in any way indispensable.

The reception processing means 20 also comprise a multiplexer 205 having a first input E60 connected to the output of the decoding circuit 2003, a second input E70 connected to the output of the decoding circuit 2003 via an inverter 206, a control input EC2 configured to receive the successive indications $Ind_i$, and an output S501 delivering the scrambled packets $PI_i$.

The output S501 of the multiplexer 205 is furthermore connected to the input E40 of a multiplexer 2004, the other input E30 of which is connected to the output of a register 2005 containing the descrambling key KB equal to the scrambling key K.

A control signal SC controls the multiplexer 2004 on its input E30 for the case in which the scrambled initial packet is the first packet, and on its input E40 for the other subsequent scrambled initial packets. The output S40 of the multiplexer 2004 is connected to the input 200 of the register 2002.

In the case in which an electromagnetic interference mitigation process has been carried out at the transmission level, as illustrated in FIG. 12, the reception device 2 then comprises reception preprocessing means or a reception preprocessor 21 configured to carry out the electromagnetic interference mitigation process on the successive encoded secondary packets $PMBBS_i$ (which in this example are scrambled), so as to deliver successive processed secondary packets which in this case are the successive scrambled initial packets $PMBI_i$.

In this regard, an additional EXCLUSIVE OR gate 210 has a first input E80 intended to receive the successive encoded secondary packets $PMBBS_i$ and an input E81 connected to a circular shift register 211 configured to deliver the successive decoding keys $KDM_i$. The shift register 211 is also clocked at a frequency equal to one $n^{th}$ of the bit frequency, where n is the number of bits of each packet.

The output S90 of the gate 210 is connected in this case to the input E100 of the register 2001.

This being the case, if only the interference mitigation process has been carried out at the transmission level, the device 2 then only comprises the preprocessing means 21. The transmission and reception devices may advantageously be produced in an integrated form.

Figure 13:
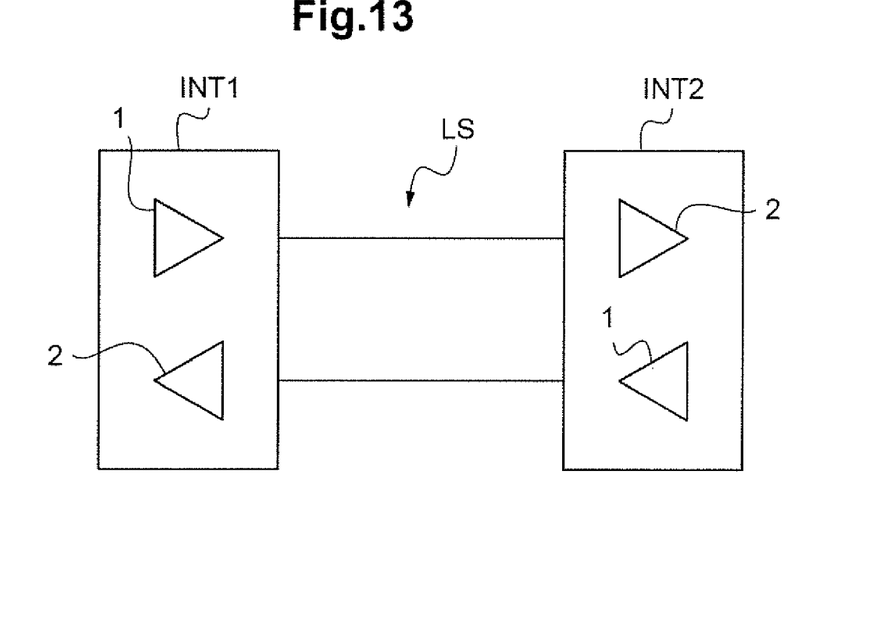

Furthermore, as schematically illustrated in FIG. 13, the transmission 1 and reception 2 devices may advantageously be integrated within two communication interfaces INT1 and INT2 connected to one another by the serial link LS.

Figure 14:
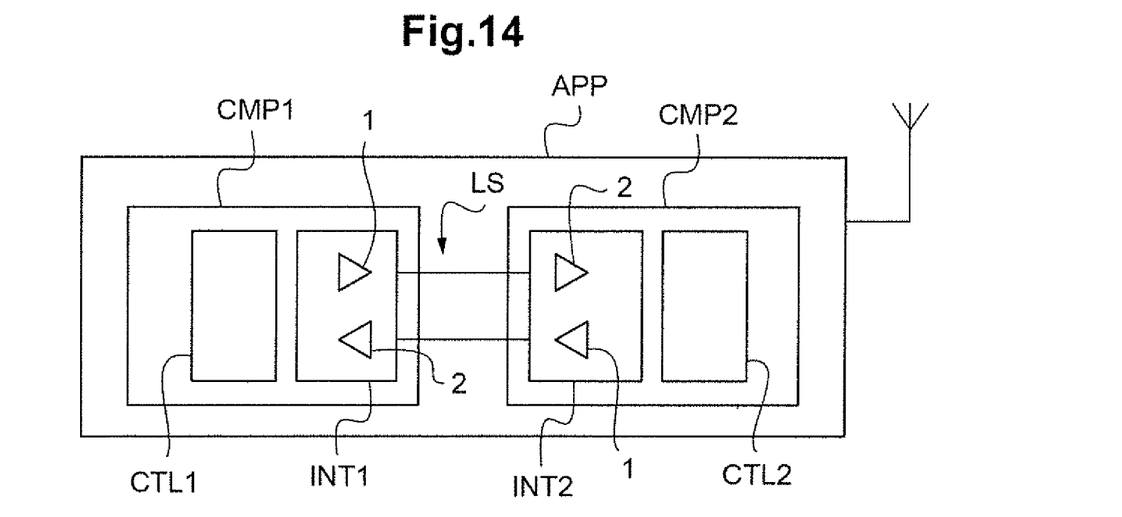

As illustrated in FIG. 14, and by way of a nonlimiting example, the interfaces INT1 and INT2 may be incorporated within two separate physical component layers CMP1 and CMP2 connected by the serial link LS comprising one or more transmission channels and one or more reception channels. For example, this serial link supports the point-to-point serial interface protocol such as the low latency MIPI interface.

The low latency interface LLI is a point-to-point interconnection between two components. Each point or node may implement a data transfer protocol such as the MIPI LLI protocol, comprising multiple layers which may be based on the OSI (Open System Interconnection) protocol stack.

Such a protocol stack generally comprises at least one physical layer (PHY) and a data link (DL) layer above the physical layer. Protocols such as the MIPI LLI and MIPI UNIPRO protocols have an intermediate layer for adaptation of the physical layer (Physical Adapter: PA Layer). This makes it possible, in particular, to support multiple physical layers such as MIPI M-PHY layers, and to use a corresponding physical adapter layer.

The MIPI LLI protocol uses an MIPI M-PHY layer as the physical layer. The protocol stack furthermore comprises a transaction layer above the data link layer.

The physical adapter layer, the data link layer and the transaction layer form the upper protocol layers of the protocol stack. The upper protocol layers may be produced by state machines and incorporated within a microcontroller, referred to as an LLI controller. The physical layer, for example MIPI M-PHY, is produced within an analog module.

In FIG. 14, the component CMP1 comprising the controller LLI CLT1 and the controller LLI CLT2 may be incorporated within a communication apparatus such as a cellular mobile telephone APP. The first component CMP1 may, for example, be an application processor, while the second controller CMP2 is, for example, a display interface platform (display hub).

That which is claimed is:

1. A method for transmitting a signal over a serial link comprising:
    performing, before transmission over the serial link, a scrambling process on two successive initial packets of the signal to form a scrambled packet for each initial packet, the scrambling process comprising, for each initial packet
        an encoding process to obtain an encoded packet, the encoding process comprising, for each current initial packet starting from a second packet, encoding of a current initial packet with a preceding scrambled packet,
        a determination of a bit disparity of the encoded packet and a determination of a cumulative bit disparity, and
        a comparison process involving the bit disparity of the encoded packet and the cumulative disparity, with the scrambled packet being the encoded packet or an inverted encoded packet, depending on a result of the comparison process.

2. The method according to claim 1, further comprising formation of an indication of the result of the comparison to be transmitted over the serial link.

3. The method according to claim 1, wherein the comparison process comprises a comparison between the absolute value of a difference between the cumulative disparity and the bit disparity of the encoded packet against an absolute value of a sum of the cumulative disparity and the bit disparity of the encoded packet.

4. The method according to claim 3, wherein the scrambled packet is the encoded packet if the absolute value of the difference between the cumulative disparity and the bit disparity of the encoded packet is greater than or equal to the absolute value of the sum of the cumulative disparity and the bit disparity of the encoded packet, and an inverse of the encoded packet if the absolute value of the difference between the cumulative disparity and the bit disparity of the encoded packet is less than the absolute value of the sum of the cumulative disparity and the bit disparity of the encoded packet.

5. The method according to claim 1, wherein the encoding of the current initial packet starting from the second packet comprises application of an invertible logical operator to the current initial packet and to the preceding scrambled packet.

6. The method according to claim 1, wherein the process of encoding the first initial packet comprises encoding of the first initial packet with a scrambling key.

7. The method according to claim 6, wherein the encoding of the first initial packet comprises application of a symmetrical and invertible logical operator to a first initial packet and to the scrambling key.

8. The method according to claim 1, further comprising, before transmission over the serial link and before or after the scrambling process, performing an electromagnetic interference mitigation process on successive primary packets of the signal, and delivering successive processed primary packets.

9. The method according to claim 8, wherein the electromagnetic mitigation process comprises, for each primary packet, encoding of the primary packet with an encoding key, with the encoding key being different from one primary packet to another, and the encoding key having a constant bit disparity from one encoding key to another.

10. The method according to claim 9, wherein the encoding of the primary packet with the encoding key comprises the application of an invertible additional logical operator to the primary packet and to the encoding key.

11. A method for transmitting a signal over a serial link comprising:
    performing, before transmission over the serial link, an electromagnetic interference mitigation process on successive primary packets of the signal and delivering successive processed primary packets, the mitigation process comprising, for each primary packet, encoding of the primary packet with an encoding key, the encoding key being different from one primary packet to another, and the encoding key having a constant bit disparity from one encoding key to another.

12. The method according to claim 11, wherein the encoding of the primary packet with the encoding key comprises application of an invertible additional logical operator to the primary packet and to the encoding key.

13. A method for receiving a signal sent over a serial link comprising:

performing a descrambling process on successive scrambled initial packets of the signal and forming a descrambled packet for each scrambled initial packet, the descrambling process comprises, for each scrambled initial packet
- a decoding process to obtain a decoded packet, the decoding process comprising, for each current received scrambled initial packet starting from a second packet, decoding of the current scrambled initial packet with the preceding descrambled packet, and with the descrambled packet being the decoded packet or an inverted decoded packet, depending on an indication associated with the scrambled initial packet and contained in the received signal.

14. The method according to claim 13, wherein the decoding of the current scrambled initial packet starting from the second packet comprises application of a logical operator, which is an inverse of that used to obtain the current scrambled initial packet, to the current scrambled initial packet and to the preceding descrambled packet.

15. The method according to claim 14, wherein the process of decoding the first scrambled initial packet comprises decoding of the first scrambled packet with a descrambling key identical to a scrambling key used to obtain the first scrambled initial packet.

16. The method according to claim 14, wherein the decoding of the first scrambled initial packet comprises application of an inverse logical operator to the first scrambled initial packet and to the descrambling key.

17. The method according claim 13, further comprising, before or after the descrambling process, performing an electromagnetic interference mitigation process on successive encoded secondary packets of the received signal and delivering successive processed secondary packets.

18. The method according to claim 17, wherein the mitigation process comprises, for each encoded secondary packet, decoding of the encoded secondary packet with an additional logical operator which is the inverse of that used to obtain the encoded secondary packet and a decoding key identical to an encoding key used to obtain the encoded secondary packet, with the decoding key being different from one encoded secondary packet to another, and the decoding key having a constant bit disparity from one decoding key to another.

19. The method according to claim 18, wherein the decoding of the encoded secondary packet with the decoding key comprises the application of an additional EXCLUSIVE OR function to the secondary packet and to the decoding key.

20. A method for receiving a signal sent over a serial link comprising:
performing an electromagnetic interference mitigation process on successive encoded secondary packets of the received signal and delivering successive processed secondary packets, the mitigation process comprising, for each encoded secondary packet, decoding of the encoded secondary packet with an additional logical operator which is an inverse of that used to obtain the encoded secondary packet and a decoding key identical to an encoding key used to obtain the encoded secondary packet, the decoding key being different from one encoded secondary packet to another, and the decoding key having a constant bit disparity from one decoding key to another.

21. The method according to claim 20, wherein the decoding of the encoded secondary packet with the decoding key comprises the application of an EXCLUSIVE OR function to the encoded secondary packet and to the decoding key.

22. A device for transmitting a signal over a serial link comprising:
a transmission processor configured to carry out, before transmission over the serial link, a scrambling process on successive initial packets of the signal so as to form a scrambled packet for each initial packet, said transmission processor comprising
an encoding circuit configured to carry out an encoding process on each initial packet so as to deliver an encoded packet, the encoding process comprising, for each current initial packet starting from a second packet, encoding of the current initial packet with the preceding scrambled packet,
calculation circuitry configured to determine, for each initial packet, a bit disparity of the encoded packet and determination of a cumulative bit disparity, and
comparison circuitry configured to carry out a comparison process involving the bit disparity of the encoded packet and the cumulative disparity, the scrambled packet being the encoded packet or an inverted encoded packet, depending on a result of the comparison process.

23. The device according to claim 22, wherein said transmission processor is configured to form, with the scrambled packet, an indication of a result of the comparison process, to be transmitted over the serial link.

24. The device according to claim 22, wherein said comparison circuitry is configured to carry out a comparison between, on the one hand, an absolute value of a difference between the cumulative disparity and the bit disparity of the encoded packet and, on the other hand, an absolute value of a sum of the cumulative disparity and the bit disparity of the encoded packet.

25. The device according to claim 24, wherein said transmission processor is configured to deliver, as the scrambled packet, the encoded packet if the absolute value of the difference between the cumulative disparity and the bit disparity of the encoded packet is greater than or equal to the absolute value of the sum of the cumulative disparity and the bit disparity of the encoded packet, and an inverse of the encoded packet if the absolute value of the difference between the cumulative disparity and the bit disparity of the encoded packet is less than the absolute value of the sum of the cumulative disparity and the bit disparity of the encoded packet.

26. The device according to claim 23, wherein said transmission processor comprise a multiplexer having a first input connected to the output of said encoding circuit, a second input connected to the output of said encoding circuit via an inverter, a control input configured to receive the indication of the comparison process, and an output delivering each scrambled packet.

27. The device according to claim 22, wherein said encoding circuit comprises an invertible logical operator having a first input to receive the initial packet, a second input to receive, for each current initial packet starting from the second, the preceding scrambled packet, and for the first initial packet a scrambling key, and an output to deliver the encoded packet.

28. The device according to claim 22, further comprising, upstream or downstream of said transmission processor, a transmission preprocessor configured to carry out an electromagnetic interference mitigation process on successive primary packets of the signal so as to deliver successive processed primary packets.

29. The device according to claim 28, wherein said transmission preprocessor comprises an encoding circuit configured to encode each primary packet with an invertible additional logical operator and an encoding key, with the encoding key being different from one primary packet to another packet, and the encoding key having a constant bit disparity from one encoding key to another encoding key.

30. The device according to claim 29, wherein said encoding circuit comprises an additional EXCLUSIVE OR logic gate having a first input to receive the primary packet, a second input intended to receive the corresponding encoding key, and an output to deliver the processed primary packet.

31. A device for transmitting a signal over a serial link comprising:
    a transmission preprocessor configured to carry out, before transmission over the serial link, an electromagnetic interference mitigation process on successive primary packets of the signal so as to form successive processed primary packets, said transmission preprocessing means comprising an encoding circuit configured to encode each primary packet with an invertible additional logical operator and an encoding key, the encoding key being different from one primary packet to another packet, and the encoding key having a constant bit disparity from one encoding key to another encoding key.

32. The device according to claim 31, wherein said encoding circuit comprises an EXCLUSIVE OR logic gate having a first input to receive the primary packet, a second input to receive the corresponding encoding key, and an output to deliver the processed primary packet.

33. A device for receiving a serial signal sent over a serial link comprising:
    a reception processor configured to carry out a descrambling process on successive scrambled initial packets of the signal so as to form a descrambled packet for each scrambled initial packet, said reception processor comprising
        a decoding circuit configured to carry out a decoding process on each scrambled initial packet so as to deliver a current decoded packet, the decoding process comprising, for each current scrambled initial packet starting from the second packet, decoding of the current scrambled initial packet with the preceding descrambled packet,
    the descrambled packet being the decoded packet or an inverted decoded packet, depending on an indication associated with the scrambled initial packet and contained in the received signal.

34. The device according to claim 33, wherein said decoding circuit is furthermore configured to decode the first scrambled initial packet with a descrambling key identical to a scrambling key used to obtain the first scrambled initial packet.

35. The device according to claim 34, wherein said decoding circuit comprises a logical operator which is an inverse of that used to obtain the scrambled initial packets, having a first input to receive the scrambled initial packet, a second input to receive, for each current scrambled initial packet starting from the second packet, the preceding descrambled packet, and for the first scrambled packet the descrambling key.

36. The device according to claim 33, wherein said reception processor comprise a multiplexer having a first input connected to the output of the decoding circuit, a second input connected to the output of the decoding circuit via an inverter, a control input configured to receive the indication, and an output delivering the descrambled packet.

37. The device according to claim 33, further comprising, upstream or downstream of the reception processor, a reception preprocessor configured to carry out an electromagnetic interference mitigation process on successive encoded secondary packets of the received signal so as to deliver successive processed secondary packets.

38. The device according to claim 37, wherein said reception preprocessor comprise an additional decoding circuit configured to decode each encoded secondary packet with a decoding key identical to an encoding key used to obtain the encoded secondary packet, the decoding key being different from one encoded secondary packet to another packet, and the decoding key having a constant bit disparity from one decoding key to another decoding key.

39. The device according to claim 38, wherein said additional decoding circuit comprises an additional logical operator which is an inverse of that used to obtain the encoded secondary packets, having a first input for receiving the encoded secondary packet, a second input for receiving the corresponding decoding key and an output for delivering the corresponding processed secondary packet.

40. A device for receiving a serial signal sent over a serial link comprising:
    a reception preprocessor configured to carry out an electromagnetic interference mitigation process on successive encoded secondary packets of the received signal and delivering successive processed secondary packets, said reception preprocessor comprising
    a decoding circuit configured to decode each encoded secondary packet with an additional logical operator, which is an inverse of that used to obtain the encoded secondary packets, and a decoding key identical to an encoding key used to obtain the encoded basic packet, the decoding key being different from one encoded basic packet to another packet, and the decoding key having a constant bit disparity from one decoding key to another decoding key.

41. The device according to claim 40, wherein said decoding circuit comprises an EXCLUSIVE OR logic gate having a first input for receiving the encoded secondary packet, a second input for receiving the corresponding decoding key and an output for delivering the corresponding processed secondary packet.

42. A communication apparatus comprising:
    at least one communication interface comprising
        a transmitting device for transmitting a signal over a serial link comprising
            a transmission processor configured to carry out, before transmission over the serial link, a scrambling process on successive initial packets of the signal so as to form a scrambled packet for each initial packet, said transmission processor comprising
            an encoding circuit configured to carry out an encoding process on each initial packet so as to deliver an encoded packet, the encoding process comprising, for each current initial packet starting from a second packet, encoding of the current initial packet with the preceding scrambled packet, calculation circuitry configured to determine, for each initial packet, a bit disparity of the encoded packet and determination of a cumulative bit disparity, and comparison circuitry configured to carry out a comparison process involving the bit disparity of the encoded packet and the cumulative disparity, the scrambled packet being the encoded packet or an inverted encoded packet, depending on a result of the comparison process; and a reception device for receiving a serial signal sent over the serial link comprising a reception processor configured to carry out a descrambling process on successive scrambled initial packets of the signal so as to form a descrambled packet for each scrambled initial packet, said reception processor comprising a decoding circuit configured to carry out a decoding process on each scrambled initial packet so as to deliver a current decoded packet, the decoding process comprising, for each current scrambled initial packet starting from the second packet, decoding of the current scrambled initial packet with the preceding descrambled packet, the descrambled packet being the decoded packet or an inverted decoded packet, depending on an indication associated with the scrambled initial packet and contained in the received signal.

* * * * *